July 30, 1968
D. C. McLEAN
3,394,527
REINFORCING ANISOTROPIC NON-HOMOGENEOUS
ENGINEERING STRUCTURES
Filed July 24, 1967
3 Sheets-Sheet 1
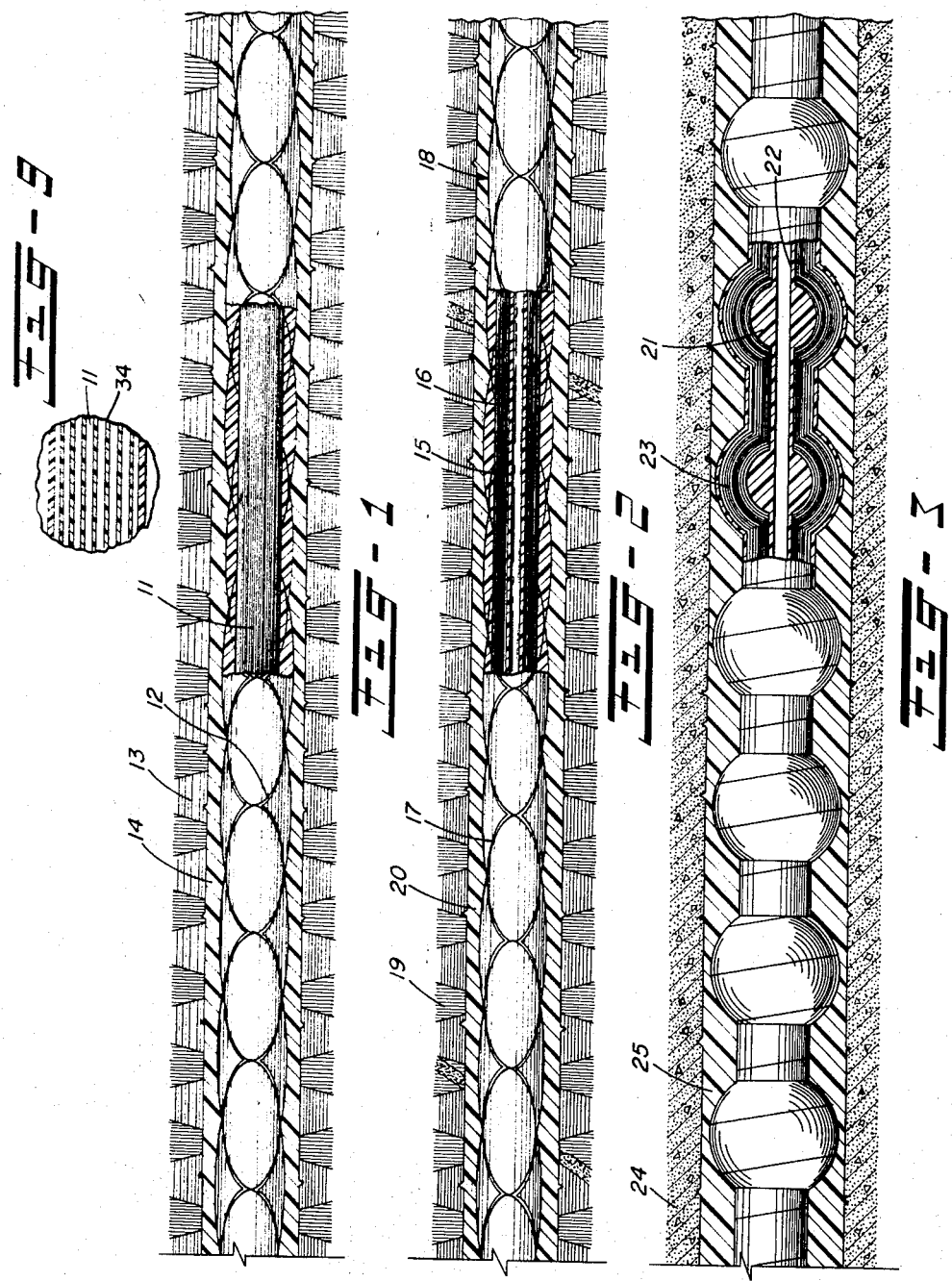
INVENTOR.
DANIEL CHALMERS McLEAN
BY
Samuel Branch Walker
ATTORNEY

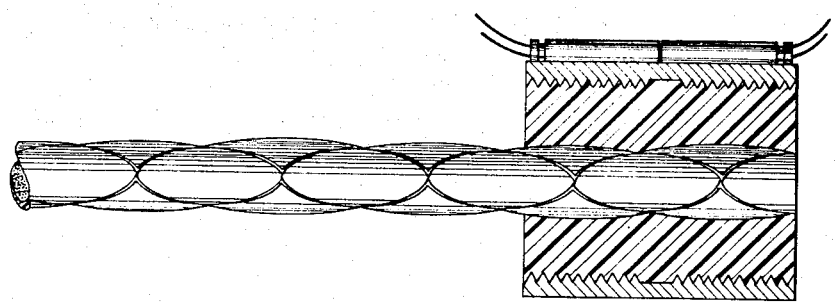
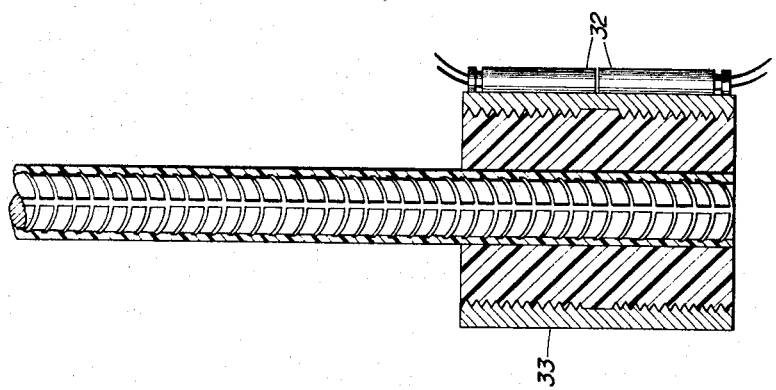
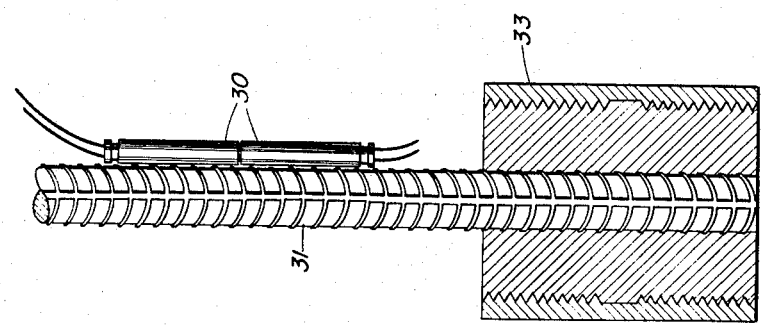

United States Patent Office 3,394,527
Patented July 30, 1968

3,394,527
REINFORCING ANISOTROPIC NON-HOMOGENEOUS ENGINEERING STRUCTURES
Daniel Chalmers McLean, Lemont, Pa., assignor to American Cyanamid Company, Stamford, Conn., a corporation of Maine
Continuation-in-part of application Ser. No. 403,245, Oct. 12, 1964. This application July 24, 1967, Ser. No. 660,154
9 Claims. (Cl. 52—741)

ABSTRACT OF THE DISCLOSURE

Underground rock is reinforced into an engineering structure of predictable minimum load bearing characteristics by inserting fiber-glass rods into drilled holes in the rock, and which are adhesively united to the rock by a viscoelastic organic polymer, which also modifies shock wave energy and renders the reinforced structure more resistant to live loading.

CROSS-REFERENCES TO RELATED APPLICATIONS

This application is a continuation-in-part of application Ser. No. 403,245, filed Oct. 12, 1964, now abandoned, and also of application Ser. No. 407,205, filed Oct. 28, 1964, now U.S. Patent 3,332,244, July 25, 1967, Reinforcing Bolts, which in turn is a continuation-in-part of application Ser. No. 317,563, filed Oct. 21, 1963, now U.S. Patent 3,324,663, June 13, 1967, Rock Bolting, and said Ser. No. 403,245.

Application Ser. No. 498,584, Oct. 20, 1965, now U.S. Patent 3,302,410, Feb. 7, 1967, Rock Bolting Package Usage, is another continuation-in-part of said Ser. No. 317,563.

Application Ser. No. 498,585, Oct. 20, 1965, now U.S. Patent 3,324,662, June 13, 1967, Valved Rock Bolt is a division of said Ser. No. 317,563.

BRIEF SUMMARY OF THE INVENTION

This invention relates to a method of reinforcing engineering structures consisting of (1) a first structural element of a brittle material comparatively weak in tension, of anisotropic non-homogeneous material such as rock, and weathered concrete having (2) reinforcing elements therein, as a second structural element, of a glass fiber material, strong in tension, such as fiber-glass rods, bars or other shapes consisting of single thin strands of glass fibers adhesively united, by (3) interposing between said structural elements and adhesively uniting said elements to each other with a viscoelastic organic polymer such as polyester resins or epoxy resins or polyurethane resins, which may or may not be filled or otherwise modified to improve the viscosity characteristics for injection and/or decrease the volumetric cost, with the polymer being placed in a softened condition and hardened in place, including use as a surface and internal reinforcing for underwater concrete, which may be emplaced without dewatering.

The propagation of wave energy of either shock wave or sound wave type is markedly modified by the presence of the viscoelastic material, which transforms at least part of the energy to random thermal energy and dissipates the same, thus changing the reflection and refraction characteristics so as to prevent or reduce the high concentration of local stresses from standing waves or reinforcing waves which would otherwise tend to concentrate at the interfaces between the brittle rock or weathered concrete and the tension member or at surfaces, or particular locations in the brittle rock or weathered concrete thus inducing localized failure, frequently in tension or shear, even though the static stress is primarily compressive.

One of the problems which has long baffled engineers is a full treatment of the propagation of wave energy through structures. In the more elemental structures of homogeneous materials, particularly those with isotropic properties and simple geometrical configuration, rigorous mathematical treatment of the effects of the propagation of wave energy has been possible as boundary layer problems in advanced mathematical physics. Certain types of such propagation are discussed in the monograph, "Stress Waves in Solids," by H. Kolsky, Clarendon Press, Oxford, 1953. Another paper by the same author appears as the chapter, "Experimental Wave Propagation in Solids, Proceedings of the First Symposium on Naval Structural Mechanics," edited by J. N. Goodier and N. J. Hoff, Pergamon Press, New York, 1960. Other papers in the same collection are also hereby incorporated by reference.

The rigorous mathematical treatment of the propagation of stress waves in solids involves second order differentiation operators and advanced mathematics, even if simplified by the assumptions of homogeneity and an isotropic solid in simple geometrical shapes. A rigorous mathematical treatment is not reasonable practical in non-homogeneous and/or anisotropic solids of complex configuration, such as naturally occurring rock in place in the earth, hereinafter referred to as "rock," or concrete which has become so weathered as to possess uncertain and unpredictable characteristics, particularly when reinforced with tension members.

In such structures, wave energy, either of the shock wave type having a velocity of propagation greater than the speed of sound or energy propagated at the speed of sound, at either sonic or superconic frequencies, must be handled empirically. The union between the weathered concrete or rock and the reinforcing tension member is open to conjecture initially, and subject to failure. When it is considered that a distortion wave incident at a free boundary at a given angle of incidence produces a reflected distortion wave and a refracted dilation wave, the velocities of propagation of which are different (note Kolsky, supra.) and these waves are affected at boundaries between two solid media by the normal displacements, tangential displacements, the normal stress and the tangential stress, with resulting reinforcement, cancellation or standing wave action, it is easy to see that a local instantaneous high stress concentration can cause failure in shear or tension of the bond between two different materials or even internally in one of the materials as well as at the surface of such materials. With a comparatively brittle material, weak in tension, and, accordingly, probably comparatively weak in shear, such as rock or weathered concrete, failure in detail can result in conditions leading rapidly to catastrophic failure.

In addition to the internal waves, surface waves are set up at exposed faces, which in solids are frequently referred to as Rayleigh waves. Also at times there are waves at the interface between two solid phases in contact, sometimes referred to as Love waves. The velocity of the surface waves or Rayleigh waves is less than that of dilation waves. Major differences of specific gravity, Young's modulus and Poisson's ratio affect the propagation of all of these types of waves. In systems where the specific gravity, Young's modulus and Poisson's ratio are closer together, local stress variations are reduced. Therefore, the boundary layer interactions caused by wave propagation from the brittle weathered concrete or rock, to the viscoelastic material and in turn from the viscoelastic material to the tension member, is markedly less than would be the distortion introduced in the absence of the viscoelastic layer.

Another type of failure in reinforced structures is failure of the adhesive bond between the reinforcing tension members and the brittle member. Axial tension on the tension member tends to elongate such members, and if the strain permits a shear stress greater than the adhesive value to be induced, failure along the line of contact, such as a ring line of contact, occurs as a travelling phenomena. The line of failure travels, almost like peeling a banana. The transfer of stress from a reinforcing tension element to a brittle compression element is apt to be of this travelling ring type.

The failure of structures reinforced with steel rods may be of this type. For a smooth reinforcing rod in a smooth brittle member, linear ring failure occurs, and the length of anchorage is of little significance, as the failure is sequential and the line of failure travels axially along the rod. The full strength of the tension member is never developed.

Glass fibers have been used to reinforce new concrete, which has much more predictable propertus, as for example disclosed in U.S. Patent 2,921,463, Goldfein, "Concrete Structural Element Reinforced With Glass Fibers," Jan. 19, 1960. Such use calls for the adhesive uniting of the glass fibers to the concrete or the use of glass fibers in the concrete but this appears to be a minimum glue line type of adhesion in which the static loading is of primary importance. A thicker viscoelastic plastic layer would permit energy absorption but such concept does not appear to be taught or understood by the prior art. Other studies have been made, as for example J. A. Roberts and H. E. Vivian, "Studies in Reinforcement-Concrete Bond, (I) Improvements in Bond," Australian Journal of Applied Science, volume 12, No. 1, pages 104 to 130, 1961, and "(II) Behavior of Bond in the Presence of Calcium Chloride Additive and Under Steam-Curing Conditions," ibid., pages 131 to 139.

Thermosetting resin bonded glass fiber reinforcement of concrete is shown by expired patents such as 2,425,883, Jackson, Aug. 19, 1947.

It has now been found that weathered concrete or underground rock formations may be greatly strengthened against shock waves or other types of dynamic energy waves by improving the adhesion of the tension member to the compressive member, separated by the viscoelastic resin as a damping member whereby localized overstressing is prevented, wave energy is damped, and dissipated as heat, and preferably sufficient elasticity exists in the viscoelastic element that on overstressing under extreme conditions the viscoelastic layer deforms locally and without catastrophic failure, to permit slippage with retention of major structural strength.

A viscoelastic layer of from about 1/16" to about 1/2" or over can transform wave energy, prevent local overloading, and give far greater strength under shock conditions, and is an excellent wave energy modifying thickness. If small areas exist with a thinner layer, the structure is still reinforced to a major extent. Contact may be made as for example by a bar in a hole in rock that touches at three points and is thereby retained in the hole.

A thickness of greater than 1/2" is very effective but is apt to be undesirably expensive. The cost can at least in part be reduced by adding diluents such as cement or asbestos, fiber, sand, or other filled materials to extend the volume without reducing the effectiveness of the viscoelastic polymer.

The polymer is a rapid setting ambient temperature curing preferably waterproof strong non-shrinking type. The epoxies usually give good results, as do the polyurethanes. From cost consideration, polyester resins are frequently preferred. The polyester resins disclosed and claimed in said 3,324,663 give good results, although the present invention is not limited to such resins.

Cyanoacrylates and copolymers of polyesters and acrylates can be used, as well as other strong viscoelastic polymers as such become economically available.

*Polyester resin system.*—In one formulation the resin per se is an unsaturated polymerizable polyester resin mixed with a monomeric polymerizable ethylenic compound together with an inhibitor and a promoter. The alkyd components of conventional polyester resins are useful and include the usual alpha, beta ethylenically unsaturated polycarboxylic acid, which may have a saturated polycarboxylic acid present. The polyester alkyds are partially condensed with such an acid or mixtures of acids or their anhydrides by heating until reaction occurs. The degree of condensation is determined by the acid number, in accordance with conventional practice. An acid number of from about 25 to about 60 gives good results, with a range of 35 to 50 being preferred. Such resins may be made as disclosed in the examples below, or may be purchased as the alkyd component resulting from the condensation and mixed with a monomeric cross-linking agent, or purchased complete with or without stabilizers and promoters. Although styrene is preferred as the cross-linking agent for most commercial polyester resins, vinyl toluene is preferred for the present invention where the resin is to be used underground, or where the volatility and explosivity of styrene could raise a problem. Other than the fire hazard, the styrene-containing resins give excellent results. Manufacture of the resins is disclosed in many prior art patents, as above mentioned, and the resins are available commercially, such as: Polychem 167–T sold by Chemical Oil & Resin Company; Selectron R.S.N. 553 from Canadian Pittsburgh Industries, Ltd.; TVL 62036 Glidpol of Glidden, Ltd.; the Laminacs® of American Cyanamid Company, and the polyester Boat Resins of Naugatuck Chemicals.

Most of the commercial resins are sold with a quinone stabilizer and a promoter. A stabilizer gives longer shelf life, particularly if a promoter is present. The polyol-polycarboxylic acid esters are apt to have somewhat different characteristics depending upon variations in manufacture, such as the rate of heating, rate of stirring, trace impurities, etc. It is very difficult to get identical gel times, even from successive batches, because of accidental variations in manuaftcure. Accordingly, it is commercial practice to vary the amount of promoter and the amount of inhibitor to secure a desired gel and cure time. From about 0.002 to about 0.03% of phenolic inhibitor, based on the weight of the resin, is preferred. A greater amount of the inhibitor is used with a larger amount of promoter and sufficient inhibitor is used to give a desired shelf life of at least six months. Over about 0.03% of the phenolic inhibitor, as hydroquinone equivalent, is apt to slow down or prevent a complete cure.

Among the inhibitors, hydroquinone meets with the greatest commercial acceptance, but others such as the monoalkyl phenols, including monoteritary butyl phenol, monotertiary butyl hydroquinone, ortho-, meta and para-cresol, higher alkyl phenols, polyhydric phenols, including catechol, resocinol, and the partially alkylated polyhydric phenols, including eugenol, guaiacol, and mixtures of these and others may be used. These inhibitors as a class are well known to those skilled in the art.

*The promoter.*—The promoters preferred are the aniline promoters such as disclosed in U.S. Patent 2,480,928, and include tertiary monoamines which contain attached to the nitrogen atom two functionally aliphatic radicals selected from the group consisting of alkyl hydrocarbons, hydroxy-substituted alkyl hydrocarbons and aralkyl hydrocarbons and one aromatic radical selected from the group consisting of aryl hydrocarbons, azo-substituted aryl hydrocarbons, amino-substituted aryl hydrocarbons, hydroxy-substituted aryl hydrocarbons, and aldehyde-substituted aryl hydrocarbons, and salts thereof. Specific examples of this class are the following: dimethylaniline, diethylaniline, di-n-propylaniline, dimethyl-p-toluidine, dimethyl-o-toluidine, dimethyl-alpha-naphthylamine, methyl benzyl aniline, p-dimethylaminoazobenzene, N,N-dimethyl-m-aminophenol, p-hydroxy-N,N-di(beta-hydroxyethyl) aniline, p-dimethylaminophenyl oxalate, p-dimethylaminophenyl acetate, and p-dimethylaminobenzaldehyde. Alkalis such as calcium hydroxide, sodium hydroxide and sodium carbonate, if present as such, or from reaction of water with cement or plaster of Paris, ammonia and ammonium sulfate also tend to act as promoters, or supplementary promoter.

From about 0.04 to 0.2% of the promoter calculated as diethylaniline equivalent is preferred. Many of the commercially available resins have some inhibitor, frequently hydroquinone and some promoter, frequently one of the tertiary amines, present and, accordingly, less additional inhibitor and promoter is required to be added in the present formulations.

*The catalyst.*—The catalyst for the system includes the conventional peroxide type of catalysts, of which benzoyl peroxide is among the commercially preferred. Other peroxides are suitable, such as cyclohexone peroxide, hydroxy heptyl peroxide, 1-hydroxy cyclohexyl hydroperoxide-1, t-butyl hydyroperoxide, 2,4-dichlorobenzoyl peroxide and the like.

Methyl ethyl ketone peroxide gives excellent results although more care is required in handling the ketone peroxides because of their volatility. In organic peroxides are also useful, alone or mixed with organic peroxides, such as sodium percarbonate, calcium peroxide, sodium peroxide, etc.

Benzoyl peroxide is usually preferred because it is a solid with favorable price and handleability characteristics. Any of the peroxides tend towards explosivity or inflammability. For convenience in use it is desirable that the benzoyl peroxide be blended back with a compatible inert material, such as starch or flour or cement, to a composition containing about 30% of the benzoyl peroxide, which thus is in non-explosive form and may be ground and handled more conveniently.

*Water-reactive filler.*—A water-reactive filler may be present with either the resin or the peroxide. Water-reactive fillers include portland cement and plaster of Paris.

Additionally, inert fillers such as sand, silica rock dust, pulverized limestone or silica mill tailings may optionally be present. Such filers are cheap and reduce the unit volume cost of the resin.

Cement or plaster of Paris tends to settle on storage. A thickening agent reduces the rate of settling or stops it completely and even if some settling has occurred the cement is more readily resuspendable.

*Thickeners.*—Finely-divided silica, particularly pyrogenic silica, is very effective as the thickening agent. Other thickening agents, include Wollastonite, bentonite clay treated with a cationic surfactant amine, aluminum silicate treated with a cationic surfactant, aluminum silicate treated with calcium stearate, finely-divided calcium carbonate, particularly if treated with a cationic surfactant, aluminum stearate, and asbestos either as a short fiber or as a finely-divided powder.

The thickening agent is conveniently added to the resin paste. It is also effective if in the catalyst system. The thickener can be in part added to each of the resin paste and the catalyst although usually for convenience it is mixed with only one of these components. Asbestos tends to shorten shelf life if used without the water-reactive filler. When used with portland cement, excellent shelf life is obtained.

With either the resin paste or the catalyst, whichever one is free from water-reactive filler, is some water. Usually the amount of water preferred is about that which will react with the water-reactive filler. Half of this quantity of water gives good results as it reacts with part of the water-reactive filler and in wet locations, where the resin is to be used in wet holes or fresh concrete, less water can be added so that some of the water is supplied from the adjacent rock formation or concrete. Up to 25% water may be used with the larger quantities being preferred where there are larger quantities of water-reactive filler and vice versa. Based on the final resin volume from 5 to 10% of cement with one component for storage and from 1 to 10% of water, based on the final composition, is a preferred range giving storage stability, convenience of use, and a strong final resin with a minimum of shrinkage.

To aid in keeping the water mixed in with either the resin or the catalyst, an emulsifying agent is preferred. The polyoxyethylated vegetable oils are compatible with the system, give good suspension, give good emulsification of water, and good storage life. Other conventional wetting agents which are compatible with the resin may be used, such as polyoxyethylated castor oil, or the equivalent polyethylene glycol ethers of castor oil, or a polyoxyethylated alkyl phenol, such as

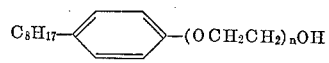

and

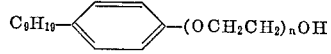

where $n$ is a small whole number. Commercially, mixtures are available where $n$ is from 3 to 16. A range of 3 to 10 is preferred. Such mixtures are sold as Tricon X–45 and Tricon N–57, and also under other names from various sources.

*Mold inhibition.*—As the present polymers are organic compounds, conditions may exist which subject such polymers, particularly in the incompletely polymerized state, to attack by molds or other microorganisms. The inclusion of about ½% pentachlorophenol, or 0.1% of phenyl mercuric acetate, or 0.1% of dodecylguanidine acetate or 0.1% of dodecylguanidine acid phthalate, or mixtures of them prevents mold growth. The exact quantity is not critical, and can be adjusted from about ¼ to 5 times the suggested amounts depending on particular conditions which may be encountered for a specific use.

In using reinforcing steel in sea walls or concrete subject to contact with sea water it has long been customary to use a very thick covering of concrete to prevent the sea water from coming in contact with the steel. Sea water is corrosive and under wave action penetrates readily. With non-pre-stressed concrete cracks may easily form permitting the entrance of sea water and corrosion which eventually leads to failure. Pre-stressed concrete which insures that the brittle member is always in compression does much to aid; as tension cracks cannot occur because there is no tension in the concrete. Thermal stresses, and other causes, of cracks frequently permit corrosion. After such weathering, even without dewatering, weathered concrete may be rejuvenated by reinforcing the surface, and the interior, with the present viscoelastic resin, using fiberglass as sheets or rods for reinforcing. Years of service can be obtained from structures which otherwise would have to be replaced.

In the accompanying drawings FIGURE 1 is a view of a solid fiber-glass reinforcement rod in rock.

FIGURE 2 is a view of a fiber-glass reinforcing bar having a small vent tube in the fibers.

FIGURE 3 is a view of a fiber-glass reinforcing rod in which the central tube has bulges to give a bulged interlocking configuration of the outer surface of the reinforcing bar.

FIGURE 6 is a view of a test procedure for testing the strength of the reinforcing bar of metal under shock conditions.

FIGURE 7 is a second test method for determining the shock resistance of a metallic reinforcing bar.

FIGURE 8 is a view of a test set up for determining the shock resistance of a fiber-glass bar.

FIGURE 9 shows an enlarged detail portion of the fiber-glass reinforcement rod of FIGURE 1.

Figure 4:
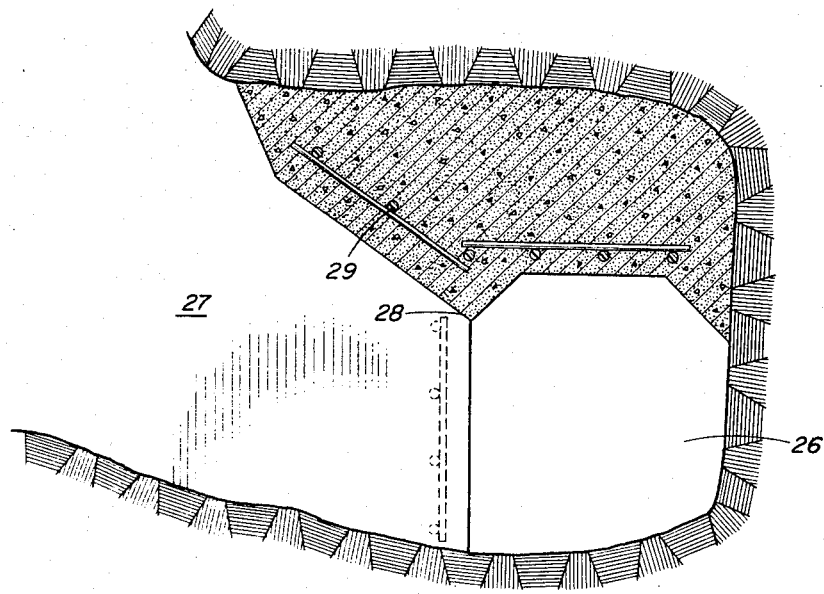
FIGURE 4 is a sectional view of a boxhole brow showing reinforcement with fiberglass bars which are resin bonded to the concrete.

The invention is exemplified below for purposes of illustration with details and specific ranges being set forth. The scope of the invention is defined in the appended claims.

In the specification and claims all parts are by weight unless otherwise indicated.

*Example 1*

A polyester resin was prepared following the procedure of Example 1 of Patent 3,324,663.

Other suitable unsaturated polyester resins are disclosed directly or by incorporation in Patent 3,091,936.

*Example 2*

To 84.5 parts of the resin from Example 1 was added 0.006 part of hydroquinone as an inhibitor, 0.9 part of Emulphor EL-719, a proprietary hydrophilic, non-ionic surfactant, made by polyoxyethylating vegetable oil, 0.025 part of diethylaniline, 1.0 part vinyl toluene, 9.4 parts water and 4 parts of Cab-o-sil, a proprietary pyrogenic colloidal silica. A separate catalyst component was prepared by mixing 18 parts of portland cement, 9 parts of Luperco AA, a proprietary peroxide catalyst, essentially a fine powder containing 30% benzoyl peroxide and 70% of an inert organic diluent (the composition is frequently used for bleaching flour), and 3 parts of dibutylphthalate. The individual components are stable for at least six months, at 70° F. The one hundred parts by weight of resin mixture are added to the 30 parts of the catalyst composition to form the finished mixed resin. Just before the time of use, the two components are mixed and may either be placed in a hole in concrete or rock, at a desired location, or may be spread in a layer on the surface of the tension reinforcing member, which is incorporated in concrete, before or after curing, or partially curing the polymer.

Other examples of a suitable viscoelastic polyester resin appear in U.S. Patent 3,324,663, supra.

*Example 3*

As shown in FIGURE 1, a plurality of glass fibers are adhesively united with the polyester resin prepared as described in Example 2, except that the water, colloidal silica and portland cement were omitted. The glass fibers were impregnated and formed into bundles by continuously dipping, and then, in a ⅞″ bar, were spirally wrapped in reverse directions, with about a 2″ lead, with a small fiber-glass bundle to both hold the fibers together during hardening and to give a surface roughness to the bar which aids in a mechanical interlocking as well as straight adhesion. As shown in FIGURE 1 the ⅞″ bar consists of glass fibers 11 with the spiral wrappings 12 were inserted into a hole drilled downward in rock 13. FIGURE 9 is an enlarged detail of a part of the rod showing the individual glass fibers 11 bonded together with the glass fiber bonding resin 34. About a 1¼″ hole was used with the annular space being filled with the polyester resin 14 of Example 2. After standing at the ambient temperature of about 75° F. for a week the elements of the rock were found to be adhesively united to the bar and by slight penetration of the resin into the rock crevasses to each other. When subject to the explosive waves from explosions in adjacent rock formations the adhesively bonded fiber-glass reinforcement is found to give a stronger formation than conventional rock bolts which are drawn up under tension against expansion shells or reinforcing steel bonded with cement grout. Under test conditions where wave energy tended to loosen the reinforcing member, the increase in strength was outstanding.

*Example 4*

The reinforcing fiber-glass rod shown in FIGURE 2 is composed of a ¼″ outside diameter polyethylene tube 15 located somewhat centrally and a plurality of glass fibers 16, which are bonded to each other and to the polyethylene tube by an epoxy resin of a conventional commercial room curing temperature type with the glass fibers held in place by spiral wrappings 17. The polyethylene tube has sufficient stiffness that it is easier to form the fiber-glass rod 18 as the polyethylene tube gives a certain stiffness up until the polymer hardens. The fiberglass rod is inserted into a hole in fractured granite 19. The polyethylene tube permits air to escape from the far end of the hole so that the reinforcing rod may be more easily placed as the epoxy resin 20 is placed in the annular space between the rod and the rock, whether overhead, level or extending downward.

After hardening, the rock of fractured granite 19 is found to be more resistant to the vibrations from rotating machinery, mine drills, and energy waves from adjacent explosives than is similar rock reinforced with steel set in grout.

*Example 5*

A reinforcing rod is prepared by stringing polyethylene balls 21 on a polyethylene tube 22 which is then coated with glass fibers 23 in polyester resin. After hardening the bulbous rod is inserted into a hole in sandstone rock 24 to which it is bonded with a polyester resin 25. The thus reinforced rock has greater resistance to explosives than conventional steel rock bolts would give. The bulbous characteristic of the surface of the rod gives a mechanical interlocking and modifies the propagation of shock waves and hence local stressing along the bar. Either with or without an additional external layer of polyester about ¼″ thick, the rod may be used to reinforce rock structures. Better shock resistance is obtained than when using steel and the reinforced rock is particularly resistant to acidic mine water.

The reinforcing glass-fiber rod is readily cut with a hacksaw and is much lighter than a steel bar of equivalent tensile strength. Whereas the resin used for placement of the reinforcing tension member must cure or harden at room temperatures, or close to room temperature for most applications; the polymer used in manufacture of the fiber-glass reinforcing bars can be cured at much higher temperatures. Hence, the polymer systems adaptable to manufacture of the the fiber-glass bars is broader. The polymer system must wet, and hence adhere to the glass fibers, or the fiber surface must be so treated as to cause adherance. The polymer should not be brittle. Otherwise a wide variety of polymer systems can be chosen. A group of high strength resins for fiber-glass bonding is known to those skilled in the art. Some are still classified information and details cannot be given here.

*Example 6*

The present rock reinforcement may be used in conjunction with glass fiber reinforced concrete. The same reinforcing bar may be embedded in both.

Figure 5:
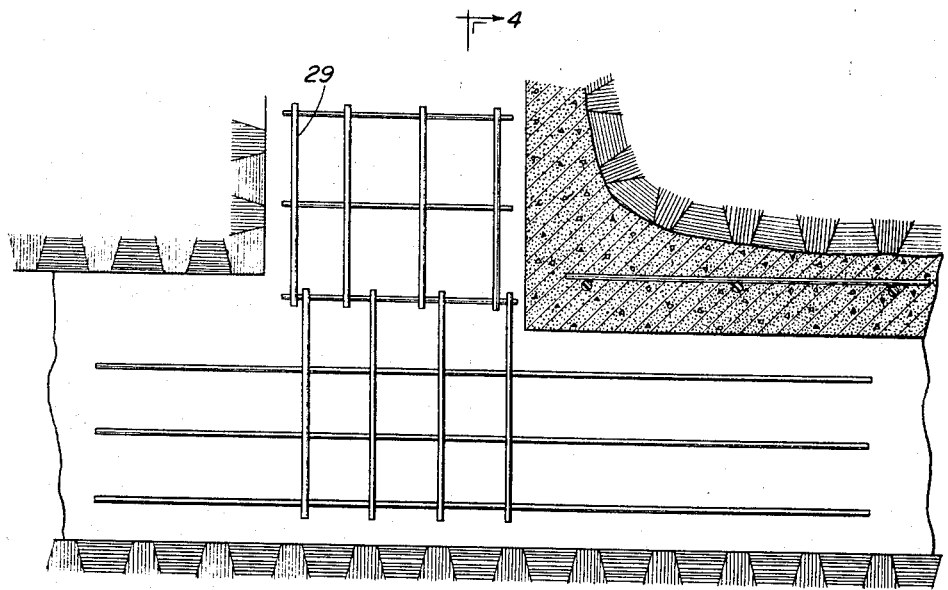
FIGURE 5 is a top view of the reinforcement of the entry of the boxhole into a haulage passage in underground mines reinforced with resin-bonded fiber-glass bars.

FIGURES 4 and 5 show the reinforcing of a boxhole brow in an underground mine. In underground mining broken rock forming the ore is hauled through a slusher drift 26 and the rock is fed down to the slusher drift through a boxhole 27. The entrance of the boxhole into the slusher drift acts as a throttle orifice and controls the flow rate of the ore. Conventionally, reinforcing holes are drilled into the rock adjacent the boxhole, particularly the boxhole brow 28, which is the overhead portion of the boxhole leading into the slusher drift, and reinforcing rock bolts inserted.

Originally, in the boxhole, reinforcing rods of fiberglass about 6′ long of the type shown in FIGURE 2 were inserted into the rock and adhesively bonded with polyester resin. The polyester permits the absorption of part of the vibration and as rock slid down through the boxhole and enlarged the opening, the fiber-glass rod was broken off and destroyed by attrition at a rate close to that of the adjacent rock. As a result the boxhole brow lasted longer than in conventional structures where steel reinforcing bolts were used. Steel reinforcing rods or rock bolts extend out into the ore passage and as chunks of the ore hit the exposed end of the bolt, vibrations transmitted tend to break the bolts loose from the rock, causing premature failure. In contrast thereto the fiber-glass reinforcing rods damped rather than transmitted energy waves and the ends frayed so that first there is not nearly as much impact to set up energy waves, and those which are set up are damped. The bulbous rods of FIGURE 3 appear to have a different propagation velocity at the bulbed and contracted portions and as a result energy transmission along the rod is more rapidly attenuated than in rods of substantially uniform characteristics.

As the boxhole wore out and became enlarged, in accordance with conventional practice, it became necessary to rebuild the boxhole brow, which was accomplished as shown in FIGURES 4 and 5. The boxhole, and particularly the brow, were reconstructed using concrete to fill in where the rock had been worn away and bring back the structure to its original configuration. Conventional concrete was used but instead of steel reinforcing members, polyester fiber-glass reinforcing rods 29 were inserted in a rectangular grid pattern using the same general spacing and configuration as for steel reinforcing members in normal concrete. About 12″ to 24″ on centers gives good results.

Even without an additional outside layer of viscoelastic polymer on the surface of the fiber-glass rods the reinforced boxhole brow gave from two to three times the life of straight steel rod reinforced boxhole brows. When the fiber-glass reinforcing rods were additionally buttered with a layer of about 3/16″ thick polyester resin of the type disclosed in Example 2, a further increase of at least 50% in useful life is obtained.

The useful life of a boxhole reconstruction and of the boxhole brow is extremely difficult to measure as the rock coming through the boxhole is not necessarily uniform in character. From time to time rock bridges or jams the boxhole which presents the interesting problem of tons of rock trying to feed down through the boxhole and which are blocked by a bridged rock jam. The miner normally has to free the rock from below, as it is impractical to drill in from above. This is usually accomplished by trying to pry the rock with a ramrod, if it is close to the exit, and if not a longer rod is used with an explosive charge fastened to the end and the explosive is placed adjacent to the rock jam and detonated. In such blasting procedures obviously the reinforcing in the boxhole, and particularly in the boxhole brow, takes a tremendous loading from the explosive charges and is weakened and eventually worn away. The rate of destruction is difficult to measure and difficult to predict.

Tests show that fiber-glass reinforcement gives a life expectancy of from two to four times the life expectancy using conventional concrete.

In reinforcing boxhole brows, steel reinforcing members actually may shorten the life of concrete, because wave energy is rapidly propagated along the bar. When the bars are exposed, blasting or rock impact sends wave energy along the bar and actually may cause failure more rapidly than if the concrete is not reinforced.

The importance of considering wave energy can be seen from the effect of reinforcing steel in boxhole brows, as even if steel is not exposed, the effect of reinforcement by steel to concrete can have such effect on wave energy as to be weaker than concrete without reinforcement. The use of a viscoelastic damping layer so modifies the propagation of wave fronts that greater blast resistance is reliably obtained.

Obviously in reinforcing rock for energy loadings as is expected in mining operations, or for the construction of silos for missiles which are designed to withstand wave energy from nuclear explosions, the increase of resiliency from the viscoelastic material which reduces tension failures and shear failures is desirable. The present method and structures give results which appear to be far superior to conventional reinforcing bars. Because the exact energy loading is unpredictable, and because in rock formations, particularly, faults and zones of weakness may occur at unexpected, unknown and unpredictable locations, factors of safety must be included and meaningful tests on full sized installations are difficult.

The use of fiber-glass reinforcing members has a most dramatic and unusual safety feature. The glass fibers in the tension members is not perfectly uniformly stressed, and when approaching failure, a few of the fibers fail, or slip in their bedding before the ultimate strength of the member is reached. The slippage or failure gives readily audible popping noises, so that as the members are loaded to failure, the bars begin to "talk" or "sing." In underground roof work, or concrete structures, this "singing" occurs a meaningful time before failure under conditions of increasing load as usually occurs in mine roof or structural failure so that adequate warning is given of incipient disaster. This safety factor emphasizes the desirability and advantages of the use of fiber-glass tension members in the present invention. See 3,332,244, supra.

Tests under standardized conditions and which are indicative of the degree of improvement expectable may be conducted using standardized conditions on a small scale. For these tests concrete was used instead of rock, as it has more uniform homogeneous properties. A larger number of tests, with statistical analysis would be required to allow for fissures and variations in rock. The same type improvements result.

*Example 7*

*Blast tests.*—For test purposes a test dummy is prepared using two 1¼″ mild iron pipe couplings with 1¼″ American Standard pipe threads, which couplings are approximately 1½″ inside diameter, 1⅞″ outside diameter, and 2″ in length, which couplings are taped together with 1″ wide pressure-sensitive tape to hold them in alignment during preparation. The couplings are placed on a flat surface, filled about ¾ full with the test material, resin or cement, and a test rod inserted and then cured. In the following tests a ⅞″ standard reinforcing steel rod was placed in the specimen. The cure was 7 days; under moist room-temperature conditions for the concrete, and dry room-temperature for the resin. The blast resistance was tested by, as shown diagrammatically in FIGURE 6, attaching two No. 6 blasting caps 30 in contact with each other to the steel reinforcing rod 31, using a pressure-sensitive tape to hold the caps in place. One of the caps was detonated electrically and the blast of one cap set off the adjacent cap so that the double strength explosion occurs adjacent to the steel reinforcing rod. The jar of the shock wave from the blast travels along the steel reinforcing rod. A similar test was conducted, as shown in FIGURE 7, in which the blasting caps 32 were placed adjacent to the pipe coupling 33. Additional tests were conducted as shown in FIGURE 8, on a fiber-glass rod and because the fiber-glass is subject to shattering from the blast, the blasting caps were used only adjacent the pipe coupling.

Using cement grout with no blast treatment the pull strength was 14 tons to pull the reinforcing rod from the coupling. After four blasts of two caps each on the ⅞″ steel rod the pull strength was found to have dropped to 9 tons. After two blasts on the pipe couplings the pull strength was found to have dropped to 8 tons.

Using the resin of Example 2 in the coupling to hold the reinforcing steel bar in place, without a blast treatment, the pull strength was 13½ tons and after four blasts on the rod or two blasts on the coupling the pull strength was approximately 13 tons. This shows that in spite of the tremendous energy absorption required, no significant shattering occurred and that the pull strength using the polymer was approximately the same before and after the wave energy absorption whereas in cement grout the strength had dropped from 14 tons to either 9 or 8 tons.

Similar results can be obtained using other sizes and shapes of reinforcing members. The blast resistance of the concrete itself can be increased somewhat by incorporating around 3½% by volume of steel wires in the concrete or 1% by volume of nylon staple or asbestos staple. The introduction of nylon staple does not increase the flex strength of the concrete but it does improve the blast resistance.

Tests in mines in rock show similar improved results after blast damage.

The impedance matching of shock wave transfer from rock or concrete to the resin, and from the resin to reinforcing steel may be improved by adding iron oxide as a filler to the resin to increase its density to intermediate between steel and the adjacent rock or concrete, if steel is to be used as the tension reinforcing member.

Dramatic increase in wave energy resistance is obtained where 1/16″ to ½″ of resin is used as a viscoelastic coupling for the steel to concrete or rock junction.

It is to be appreciated that the fiber-glass reinforcing rods have many advantages. Rods containing from 70 to 75% by weight of fiber-glass and 25 to 30% of epoxy or polyester resin can be made up in diameters of from ¼″ to 2″ conveniently and in lengths up to 20′, either solid, with a core, with bulges, and used accordingly. The rod can be produced in continuous lengths and cut to size.

The fiber-glass rod is much lighter than steel and hence one man can carry and place a fiber-glass rod much more conveniently than steel reinforcing rods. 15′ length can be conveniently carried and placed by one man.

Part of the strength of the fiber-glass rod only is usually developed because many times the rod fails by pull out but when tested it is found that the break strength of a fiber-glass rod is in the neighborhood of 120,000 pounds per square inch or higher depending upon construction conditions with a flexual modulus, or Young's modulus, of around $6 \times 10^6$ pounds per square inch per inch per inch.

The fiber-glass bolts given excellent results, particularly when anchored with a coating of viscoelastic polymer in rock, such as limestone, granite, shale or most ore bodies in which mining would be conducted. The fiber-glass bars may be placed in rock in unstressed condition or pre-stressed condition. Either pre-tensioning post-tensioning or pre-tensioning and post-tensioning may be used to permit full compression of rock or weathered concrete and hence development of maximum structural characteristics. The scope of usage for fiber-glass reinforcing members separated by a viscoelastic polymer from rock is as wide as the usages of reinforcing members themselves. Among the more common are in foundations for bridges, anchorages for suspension bridges, highways, aircraft landing fields, dams, foundation members for structures, or any other location in which rock is to be reinforced by tension members where wave energy impact is to be considered in designing. The advantages of viscoelastic damped reinforcing members becomes more apparent in reinforcing of any type of engineering structure which is subjected to energy loadings whether a consistent small vibration or a major blast action.

*Example 8*

In the design of concrete structures, such as bridges, the support columns and beams, as well as deck structures must be able to stand weathering. Conventionally, a thickness of about 3″ of concrete is used as a protective layer over reinforcing steel, to prevent corrosion of the steel. Thus a bridge deck might be 15″ thick, with the lower 3″ designed only to protect reinforcing steel from corrosion. A support column for the bridge could be 24″ x 24″, with a considerable reduction in the loading of the outer face, as it has no tension function, and is primarily to protect reinforcing steel.

In such a bridge, the use of ¼″ of polymer on the steel gives better bonding, gives viscoelastic energy damping, and corrision resistance. Hence, the 3″ layer for protection can be reduced to 1″, and a reduction made in dead load, as well as savings in cost of the member itself; hence the entire structure can be markedly lighter, and if designed for the same static load, such structure is stronger for dynamic loads.

A bridge constructed using fiber-glass reinforcing rods, of the type shown in FIGURE 3, gives considerable increase in strength, and reduction in weight. Tests indicate that resistance to corrosion is such that a considerable increase in useful life is to be expected. Complete life tests require many years. The full advantage for sea wall construction could not become obvious before a 20 to 50 year test period. Accelerated ageing indicates a markedly longer useful life, in some cases by a factor of two to four or more.

Besides the lighter foundation requirements from lighter structures, the interposition of a viscoelastic layer between, reinforcement extending into foundation rock and the rock gives improved resistance to blasts or earthquakes.

*Example 9*

A high rise apartment building constructed of fiber-glass reinforced concrete permitted smaller and lighter members on the top floors, because less protective weight of concrete is needed to shield reinforcement from corrosion. The fiber-glass bars are markedly lighter than steel, and hence the weight of reinforcement by the top floors is less. The savings build up more on lower floors because both a lighter dead load above is being carried of the floors above, and the protective concrete for protection from corrosion can be omitted from each floor. In a multiple story building, with modernized building codes, at least 25% of the dead load of the structural concrete is saved. The lighter weight permits lighter foundation rock loading. The reinforcement of rock is of great value because by pre-compressing rock so that compressed zones from adjacent tension members overlap, the rock can be placed under compression throughout wide areas and when so compressed the rock itself becomes a structural element of reasonably predictable strength characteristics and thus valuable in tunnels, underground mining, and many other uses. Thus the rock not only need not be removed but actually can be used as a material of construction by virtue of the improvements disclosed above.

*Example 10*

In an old concrete tunnel submerged under water to supply cooling sea water to a condenser for a generating station, the concrete was found to be failing at the surface and throughout by corrosion of reinforcing and weakening of the concrete by leaching by the sea water. 1⅛″ holes are drilled at an angle of about 45° with the face of the concrete in different directions, the holes extending through the concrete. Undulated fiber-glass reinforcing rods ⅞″ in diameter, long enough to extend to the bottom of the concrete and about 2″ above the surface are inserted with sufficient polyester resin to fill the holes and catalyzed to cure in about 45 minutes at construction temperature. After the fiber-glass rods harden in place a mass of fiber-glass as a mat is used as a continuous lining supported by the bolts, to prevent spalling. The surface of the concrete is first coated with the polyester resin, containing cement and fine silica as a filler, the fiber-glass mat is placed in position and additional polyester resin placed on the surface for a build-up to cover the glass fibers and smooth over the ends of the reinforcing rod. After curing the tunnel is protected against further spalling and corrosion.

In an additional section of the tunnel fiber-glass bolts having threads cut in the ends of the fiber-glass rods are installed at right angles to the surface by drilling holes in the rotting concrete and with the fiber-glass bolts inserted into the holes partially filled with polyester resin without unwatering. Skin divers are able to conveniently place the fiber-glass bolts because they were so light in weight. After the individual bolts harden in position, a fiber-glass sheet with drilled holes spaced to match the bolt heads is emplaced. One side of the fiber-glass sheet is coated with polyester resin, the sheets are placed over the bolts and formed fiber-glass nuts are used to draw the sheets up against the concrete which causes the fiber-glass sheets to be held in position until the fiber-glass coating hardens against the concrete. Should the fiber-glass bolts and nuts holding these sheets in position be broken off by objects moving through the tunnel the fiber-glass is adhesively bonded to the concrete and resists further corrosion and spalling. From preliminary tests and accelerated aging estimates it appears that the thus protected concrete tunnels would last for at least twenty years and perhaps indefinitely.

The ability of polyester resin to be placed and cured underwater saves the major expense of dewatering. Coffer dams to permit dry treatment of the surface, instead of application even in the presence of seawater can be a major item of cost.

The resilience of the polyester resins, such as here described, gives great energy absorption capabilities, for shock isolation of embedded reinforcement rods, of glass fibers or steel, in rock, but the shock absorbing characteristics are also of general utility, as in backing up steel impact plates in ore passages in mines. The continual pounding of rock breaks loose steel plates of large weight, such as a 4' by 6' by 6" steel slab used to absorb the shock of falling rock in an ore chute. The present resins absorb shock so well that such plates, set in the present resin last much longer than if set in concrete. Crusher shells for rock crushers, steel rails on concrete ties, protective steel facing for loading platforms, or concrete slabs in structures resting on concrete supports, as bridge decks, all advantageously use the present thixotropic resin to give longer life than concrete or other common backing material. The thixotropic characteristics greatly simplifies ease of placement, because confinement is not necessary to prevent flow, and the resin can be placed in the presence of water, or underwater, even if seawater.

*Example 11*

To simulate conditions of placing the resin under seawater, without dewatering weathered concrete structures, the polyester resin of Example 2 was filled into transfer tubes (Kierans et al. Patent 3,283,513) and transferred to and extruded to fill drilled holes in granite rock, from the bottom, with resin. A ⅝" steel rod was inserted into each resin containing hole. The filling and curing was completed underwater containing 3% salt, simulating seawater. Pull tests showed a pull of over 8 tons was required to pull out the rods; thus proving effective underwater placement.

*Example 12*

A series of holes were drilled in concrete which was a low cement concrete block, to simulate rotten or weathered concrete. The composition of Example 2 was used, in which additionally 20 percent of limestone grits were added, as a coarse sand, to increase the density, to more easily retain the material submerged underwater. The uncured polyester resin was readily transferred, using a transfer tube, to the bottom of the 1⅜" drilled holes and ⅞" glass fiber bars were set in the resin. The glass fiber bars with a nodular surface are locked in the concrete showing that an effective retention is obtained. If the concrete is not a very good grade of concrete, the concrete may shear or pull away from the resin, with the failure being in the concrete itself rather than in the resin to concrete bond.

For fastening polyester-glass fiber surface reinforcement, it is convenient to drill holes at about 45° to the surface of the concrete, at least partially fill the holes with uncured polyester resin, and insert polyester fiber-glass reinforcing bars having a nodular surface therein, extending above the concrete surface. After at least partially curing, a polyester fiber-glass mat can be placed against the concrete surface and retained against the surface by cords looped under the reinforcing rods, as tiecords. The projecting fiber-glass rods may be cut off by sawing to reduce the risk of debris being caught on the ends of the glass fiber rods.

Placement underwater is particularly convenient for placing a surface protecting layer on submerged concrete, such as bridge abutments, seawalls, water tunnels, etc.

Where dewatering is easy so the concrete surface is dry, there is less risk of entrapment of water or reduced adhesion due to water.

If the resin is to be placed underwater, a weighted resin, as for example resin having a sand filler is preferred so that any resin spilled will sink. The uncured resin often irritates the surface of the skin of a user. If placed underwater, care should be used to prevent the resin from coming in contact with the skin of the workmen. Using a weighted resin causes any loose resins to sink, and avoids floating resin globs which are a potential hazard to swimmers until the resin cures.

I claim:
1. A method of resisting destruction by wave energy of a reinforced structure consisting of
   a first structural element of naturally occurring rock in place in the earth which is brittle and weak in tension, and
   a second structural element of at least one tension member of a material strong in tension of fiber-glass, comprising:
      interposing between said structural elements a third structural element comprising a layer from about 1/16 inch to about ½ inch thick of a viscoelastic organic polymer, in a softened condition, hardening said polymer and thereafter subjecting the assembly to wave energy, whereby the transmission of energy through the structural elements is damped, and reflection and refraction are modified by the interposition of the viscoelastic polymer, thus preventing destructive augmentation and reinforcement of various components of wave energy in said rock structural element.

2. The method of claim 1 in which the viscoelastic organic polymer is a polyester resin.

3. The method of claim 1 in which the viscoelastic organic polymer is an epoxy resin.

4. A reinforced structure resistant to destruction by wave energy consisting of
   a first structural element, weak in tension, of naturally occurring rock in place in the earth,
   a second structural element of at least one tension member, strong in tension, of fiber-glass, and
   a third structural element comprising a layer from about 1/16 inch to about ½ inch thick of viscoelastic organic polymer of wave energy modifying thickness, interposed between said first two structural elements, whereby the transmission of energy through the structural elements is damped, and reflection and refraction are modified by the interposition of the viscoelastic polymer, thus preventing destructive augmentation and reinforcement of various components of wave energy.

5. The reinforced structure of claim 4 in which the viscoelastic organic polymer is a polyester resin.

6. The reinforced structure of claim 4 in which the viscoelastic organic polymer is an epoxy resin.

7. A method of protecting a weathered concrete structure which is subject to water leaching and has become weakened by ageing and water contact which comprises;
   drilling holes in the weathered concrete,
   at least partially filling the holes with polyester resin in a softened condition, inserting fiber-glass tension members with at least one end protruding from the concrete, in said softened polyester resin in said holes,
   at least partially hardening said resin;
   coating the surface of the weathered concrete with polyester resin in softened condition with embedded glass fibers in such coating resin, securing the resin and glass fiber coating to the concrete by fastening means attached to said protruding ends of the fiber-glass tension elements, and
   curing the polyester coating in contact with the weathered concrete, thereby strengthening and protecting the concrete surface from further leaching, thus markedly increasing the useful life of the structure.

8. The method of claim 7 in which the emplacing of the fiber-glass tension members and the placing of the surface resin fiber-glass reinforcing is accomplished underwater without the necessity for dewatering the concrete.

9. The method of claim 8 in which the water is sea water.

References Cited

UNITED STATES PATENTS

| | | | |
|---|---|---|---|
| 2,952,129 | 9/1960 | Dempsey | 61—45 |
| 2,950,576 | 8/1960 | Rubenstein | 52—309 X |
| 3,111,569 | 11/1963 | Rubenstein. | |
| 3,163,010 | 12/1964 | Carpenter | 61—36 |

JOHN E. MURTAGH, *Primary Examiner.*